(12) United States Patent
Takemori

(10) Patent No.: US 12,296,623 B2
(45) Date of Patent: May 13, 2025

(54) RUN-FLAT TIRE

(71) Applicant: The Yokohama Rubber Co., LTD., Tokyo (JP)

(72) Inventor: Ryohei Takemori, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 393 days.

(21) Appl. No.: 17/755,066

(22) PCT Filed: Sep. 30, 2020

(86) PCT No.: PCT/JP2020/037233
§ 371 (c)(1),
(2) Date: Apr. 20, 2022

(87) PCT Pub. No.: WO2021/079708
PCT Pub. Date: Apr. 29, 2021

(65) Prior Publication Data
US 2022/0388350 A1    Dec. 8, 2022

(30) Foreign Application Priority Data
Oct. 25, 2019    (JP) .................................. 2019-194308

(51) Int. Cl.
| | |
|---|---|
| *B60C 15/06* | (2006.01) |
| *B60C 3/04* | (2006.01) |
| *B60C 9/17* | (2006.01) |
| *B60C 17/00* | (2006.01) |
| *B60C 17/06* | (2006.01) |
| *B60C 13/00* | (2006.01) |

(52) U.S. Cl.
CPC ............ *B60C 15/0628* (2013.01); *B60C 3/04* (2013.01); *B60C 9/17* (2013.01); *B60C 15/0603* (2013.01); *B60C 17/0009* (2013.01); *B60C 2013/007* (2013.01); *B60C 2015/0617* (2013.01); *B60C 2015/0678* (2013.01); *B60C 2017/0072* (2013.01)

(58) Field of Classification Search
CPC .... B60C 2001/0033; B60C 2017/0054; B60C 17/0009
See application file for complete search history.

(56) References Cited

U.S. PATENT DOCUMENTS

2010/0147439 A1*  6/2010  Koeune ............... B60C 17/0018
                                                152/450

FOREIGN PATENT DOCUMENTS

| DE | 10 2011 075 940 B4 | 11/2016 |
|---|---|---|
| JP | H7-304312 A | 11/1995 |
| JP | 2009-061866 A | 3/2009 |
| JP | 2010-137853 A | 6/2010 |

(Continued)

*Primary Examiner* — Justin R Fischer
(74) *Attorney, Agent, or Firm* — Thorpe North & Western

(57) ABSTRACT

Provided is a run-flat tire. A first bead filler is disposed on an outer circumferential side of a bead core, a second bead filler is disposed on an outer side in a tire width direction of a turned up portion of the carcass layer along the turned up portion of the carcass layer, and a thickness G on a first reference line of a side reinforcing layer, a thickness G1 on a second reference line of the side reinforcing layer, and a thickness G2 on a third reference line of the side reinforcing layer satisfy the relationships of $0.8 \times G \leq G1 \leq 1.0 \times G$ and $0.5 \times G \leq G2 \leq 0.7 \times G$.

16 Claims, 2 Drawing Sheets

(56) References Cited

FOREIGN PATENT DOCUMENTS

| | | |
|---|---|---|
| JP | 2014-54967 A | 3/2014 |
| JP | 2016-132342 A | 7/2016 |
| JP | 2016-132343 A | 7/2016 |
| JP | 2017-52432 A | 3/2017 |
| JP | 2018-99922 A | 6/2018 |
| JP | 2019-64485 A | 4/2019 |
| WO | 2014/141880 A1 | 9/2014 |
| WO | 2017/188409 A1 | 11/2017 |
| WO | 2019/070085 A1 | 4/2019 |

* cited by examiner

RUN-FLAT TIRE

TECHNICAL FIELD

The present technology relates to a run-flat tire and particularly relates to a run-flat tire that can provide reduced rolling resistance and light weight while improving run-flat durability.

BACKGROUND ART

Proposed, as a pneumatic tire that can travel while flat (so-called run-flat tire), is a side reinforcing type run-flat tire that includes a reinforcing layer having a crescent-shaped cross-section and disposed on an inner surface side of a sidewall portion (see, for example, Japan Unexamined Patent Publication Nos. H07-304312 and 2009-061866). Unfortunately, in such a run-flat tire, when the volume of rubber constituting a side reinforcing layer is increased to suppress deflection under run-flat travel conditions, heat build-up is promoted and rolling resistance increases, while tire weight increases. Conversely, when the volume of the rubber constituting the side reinforcing layer is reduced, run-flat durability decreases.

SUMMARY

The present technology provides a run-flat tire that can provide reduced rolling resistance and light weight while improving run-flat durability.

A run-flat tire according to an embodiment of the present technology includes: a tread portion extending in a tire circumferential direction and having an annular shape; a pair of sidewall portions respectively disposed on both sides of the tread portion; and a pair of bead portions each disposed on an inner side in a tire radial direction of the sidewall portions; a carcass layer mounted between the pair of bead portions, a plurality of belt layers being disposed on an outer circumferential side of the carcass layer in the tread portion, a side reinforcing layer having a crescent-shaped cross-section, the side reinforcing layer being disposed on an inner side in a tire width direction of the carcass layer in the sidewall portions, and the carcass layer being turned up around the bead core of each of the bead portions from a tire inner side to a tire outer side. A first bead filler is disposed on an outer circumferential side of the bead core, and a second bead filler is disposed on an outer side in the tire width direction of a turned up portion of the carcass layer along the turned up portion of the carcass layer. A first reference line, a second reference line, and a third reference line are specified such that the first reference line is drawn from a tire maximum width position along the tire width direction, the second reference line extends through a midpoint of a length along the carcass layer from an intersection point between the first reference line and the carcass layer to an end on an outer side in the tire width direction of the belt layers and intersects the carcass layer at right angles, and the third reference line extends through a midpoint of a length along the carcass layer from the intersection point between the first reference line and the carcass layer to an end portion on an outer side in a tire radial direction of the first bead filler and intersects the carcass layer at right angles, and a thickness G on the first reference line of the side reinforcing layer, a thickness G1 on the second reference line of the side reinforcing layer, and a thickness G2 on the third reference line of the side reinforcing layer satisfy relationships of $0.8 \times G \leq G1 \leq 1.0 \times G$ and $0.5 \times G \leq G2 \leq 0.7 \times G$.

In the present technology, the thickness G on the first reference line, the thickness G1 on the second reference line, and the thickness G2 on the third reference line each in the side reinforcing layer are set to satisfy the relationships $0.8 \times G \leq G1 \leq 1.0 \times G$ and $0.5 \times G \leq G2 \leq 0.7 \times G$, and thus a portion on a belt layer side in the side reinforcing layer is thicker than a portion on a bead portion side. This contributes to suppressing deflection under run-flat travel conditions. Accordingly, run-flat durability can be effectively improved. Moreover, rolling resistance can be reduced and light weight can be achieved as well.

In a run-flat tire according to an embodiment of the present technology, the thickness G3 on the second reference line of a rubber layer located on an outer side in the tire width direction of the carcass layer preferably satisfies the relationship of $0.2 \times G1 \leq G3 \leq 0.4 \times G1$ with respect to the thickness G1 on the second reference line of the side reinforcing layer. Thus, the thickness of a buttress portion of the sidewall portion can be reduced, and light weight can be achieved.

The thickness G4 on the third reference line of the rubber layer located on the outer side in the tire width direction of the carcass layer preferably satisfies the relationship of $0.9 \times G2 \leq G4 \leq 1.1 \times G2$ with respect to the thickness G2 on the third reference line of the side reinforcing layer. By satisfying the relationship formulas described above, the turned up portion of the carcass layer is disposed in the center in a thickness direction of the bead portion, and this can prevent force in a compression direction or a tensile direction from acting on the turned up portion of the carcass layer, thus preventing damage to the carcass layer.

The height of the second bead filler is preferably greater than that of the tire maximum width position. This can increase rigidity of the bead portion thus suppressing deformation of the bead portion and effectively improve run-flat durability.

The height of the first bead filler is preferably in the range of from 10% to 25% with respect to a tire cross-sectional height. This can, under run-flat travel conditions, prevent interference of the first bead filler with respect to a region where strain at or near a rim flange is likely to be concentrated, and effectively suppress deformation of the first bead filler. Accordingly, run-flat durability can be improved and light weight can be achieved.

The height of an end portion of the second bead filler on an inner side in the tire radial direction is preferably in the range of from 50% to 75% with respect to the height of the first bead filler. This can suppress heat build-up between a contact surface with a rim and the carcass layer and can reduce rolling resistance.

The cord angle as absolute values of the belt layers with respect to the tire circumferential direction is preferably in the range of from 25° to 35°, and preferably at least one belt cover layer covering an entire width of the belt layers is provided on an outer circumferential side of the belt layers. This can suppress buckling of the tread portion and effectively improve run-flat durability.

Preferably, as the physical properties of each of the rubber constituting the first bead filler and of the rubber constituting the second bead filler, the modulus at 100% elongation is in the range of from 8.4 MPa to 10.2 MPa, the tan $\delta$ at 60° C. is in the range of from 0.04 to 0.08, and the JIS hardness at 20° C. is in the range of from 69 to 75. This can prevent occurrence of separation of the carcass layer located between the first bead filler and the second bead filler and can improve run-flat durability. In addition, the rubbers are low heat build-up rubbers having the tan $\delta$ at 60° C. in the range of from 0.04 to 0.08, and thus heat build-up under run-flat travel conditions can be suppressed, and rolling resistance can be reduced. Furthermore, the JIS hardness at 20° C. is in the range of from 69 to 75, and run-flat durability and rolling resistance can be provided in a compatible manner.

The tire cross-sectional height is preferably 135 mm or more. This is to be applied to run-flat tires having a relatively high tire cross-sectional height, and the obtained effect is significant.

In embodiments of the present technology, the tire maximum width position is a position where a tire has a maximum width when the tire is mounted on a standard rim of JATMA (the Japan AutomobileTyre Manufacturers Association, Inc.), applied to recommended inflation pressure, and in an unloaded state. The modulus at 100% elongation used to identify rubber physical properties refers to the measurement result of modulus at 100% deformation when a tensile test is performed at room temperature on a rubber sample having a shape according to dumbbell No. 3 in accordance with the JIS (Japanese Industrial Standard)-K 6251. The tan δ (60° C.) refers to the measurement result under the condition of a frequency of 20 Hz, an initial strain of 10%, a dynamic strain of +2%, and a temperature of 60° C. using a viscoelastic spectrometer, according to the JIS-K 6934. The JIS hardness (20° C.) is the durometer hardness measured under the condition of temperature of 20° C. using a type A durometer, according to the JIS-K 6253.

DETAILED DESCRIPTION

Figure 1:
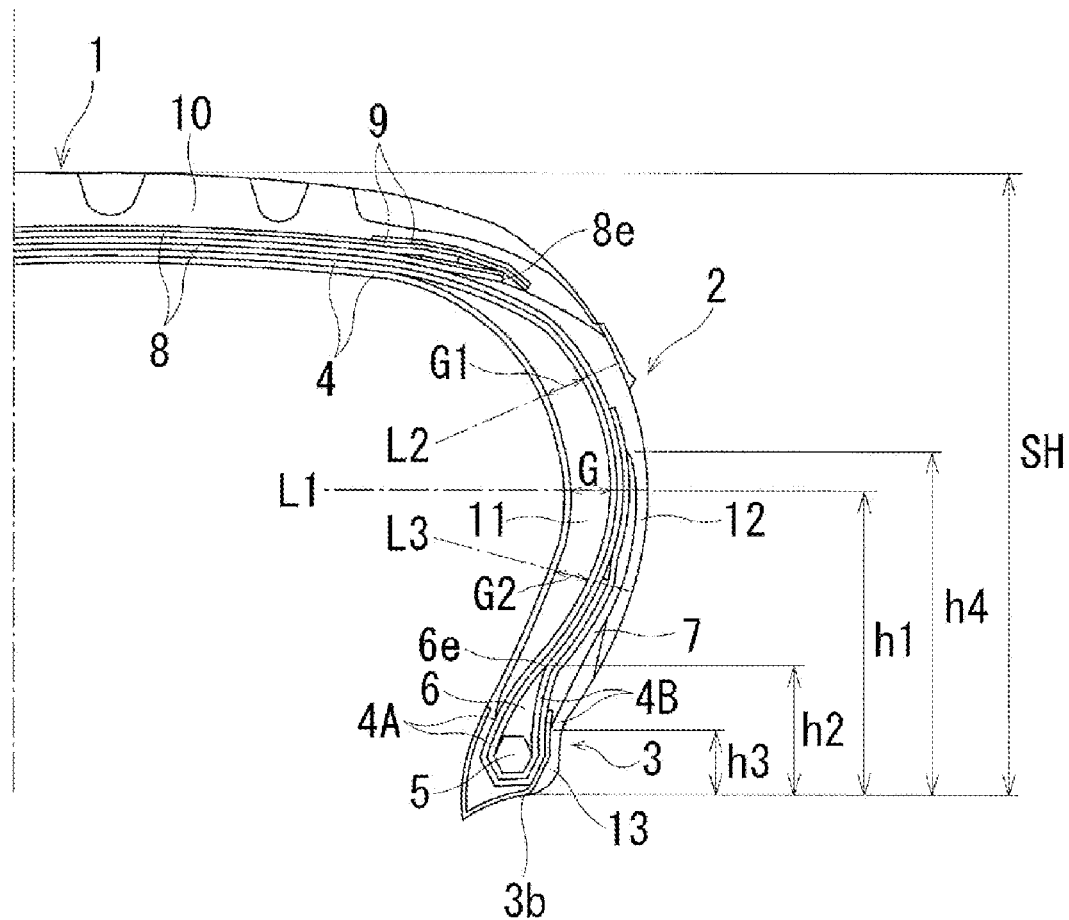
FIG. 1 is a meridian half cross-sectional view illustrating an example of a run-flat tire according to an embodiment of the present technology.

Configurations of embodiments of the present technology will be described in detail below with reference to the accompanying drawings. FIG. 1 illustrates an example of a run-flat tire according to an embodiment of the present technology.

As illustrated in FIG. 1, the run-flat tire according to the present embodiment includes a tread portion 1 extending in a tire circumferential direction and having an annular shape, a pair of sidewall portions 2 respectively disposed on both sides of the tread portion 1, and a pair of bead portions 3 each disposed on an inner side in a tire radial direction of the pair of sidewall portions 2. In FIG. 1, only a half cross-section on one side, in a tire width direction, delimited by a tire centerline CL is illustrated, but the run-flat tire has a symmetrical structure on both sides of the tire center line CL. Alternatively, an asymmetrical structure may be employed.

At least one carcass layer 4 (two layers in FIG. 1) formed by arraying a plurality of carcass cords in a radial direction is mounted between the pair of bead portions 3. Organic fiber cords of nylon, polyester, or the like are preferably used as the carcass cords constituting the carcass layer 4. A bead core 5 having an annular shape is embedded in each of the bead portions 3, and a first bead filler 6 made of a rubber composition and having a triangular cross-section is disposed on an outer circumference of the bead core 5.

On the other hand, a plurality of belt layers 8 (two layers in FIG. 1) are embedded in a tire outer circumferential side of the carcass layer 4 in the tread portion 1. The belt layers 8 include a plurality of reinforcing cords that are inclined with respect to the tire circumferential direction and the reinforcing cords are disposed so as to intersect each other between the different layers. Steel cords are preferably used as the reinforcing cords of the belt layers 8.

To improve high-speed durability, at least one belt cover layer 9 (two layers in FIG. 1) formed by arraying the reinforcing cords at an angle of, for example, 5° or less with respect to the tire circumferential direction is disposed on a tire outer circumferential side of the belt layers 8. In FIG. 1, the belt cover layer 9 located on the inner side in the tire radial direction constitutes a full cover covering an entire width of the belt layers 8, and the belt cover layer 9 located on an outer side in the tire radial direction constitutes an edge cover layer covering only end portions of the belt layers 8. Organic fiber cords such as nylon and aramid are preferably used as the reinforcing cords of the belt cover layer 9.

In the run-flat tire described above, both ends of the carcass layer 4 are folded back from the tire inner side to the tire outer side around each of the bead cores 5, and are disposed so as to wrap around the bead cores 5 and the first bead fillers 6. The carcass layer 4 includes a body portion 4A, which extends from the tread portion 1 through each of the sidewall portions 2 to the respective bead portions 3, and a turned up portion 4B, which is turned up around the bead core 5 in each of the bead portions 3 and extends toward the respective sidewall portions 2.

A second bead filler 7 is disposed on an outer side in the tire width direction of the turned up portion 4B of the carcass layer 4 in the sidewall portion 2 along the turned up portion 4B of the carcass layer 4. The second bead filler 7 is disposed so as to overlap with the first bead filler 6 and a side reinforcing layer 11 in the tire radial direction. In FIG. 1, the second bead filler 7 has one end located at a middle part of the bead filler 6 and has another end extending along the tire radial direction so as to be located at a middle part of the side reinforcing layer 11.

A tread rubber layer 10 is disposed on an outer circumferential side of the belt layers 8 and the belt cover layer 9 in the tread portion 1. The side reinforcing layer 11 having a crescent-shaped cross-section to enable run-flat travel is disposed on an inner side in the tire width direction of the carcass layer 4 in the sidewall portion 2. The side reinforcing layer 11 and the first bead filler 6 overlap in the tire radial direction. In the overlapping portion of the side reinforcing layer 11 and the first bead filler 6, the length measured along the tire radial direction is preferably in the range of from 15 mm to 30 mm. A side rubber layer 12 is disposed on an outer circumferential side of the carcass layer 4 (an outer side in the tire width direction) in the sidewall portion 2. A rim cushion rubber layer 13 is disposed on the outer circumferential side of the carcass layer 4 (the outer side in the tire width direction) in the bead portion 3.

Figure 2A:
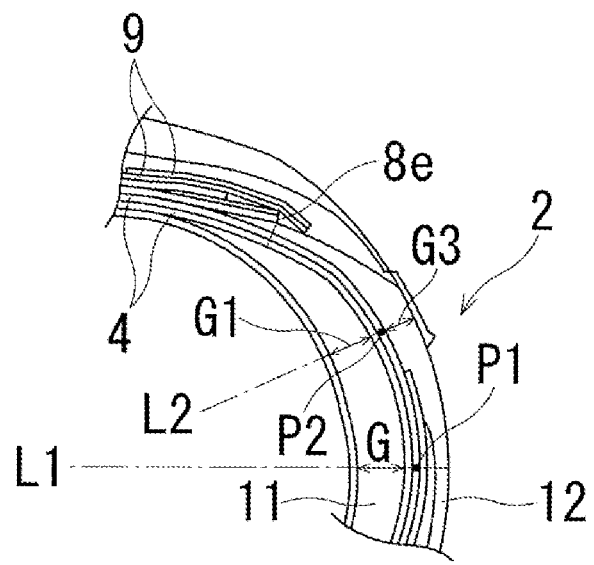
FIGS. 2A and 2B are each a cross-sectional view illustrating main portions of the run-flat tire of FIG. 1.
Figure 2B:
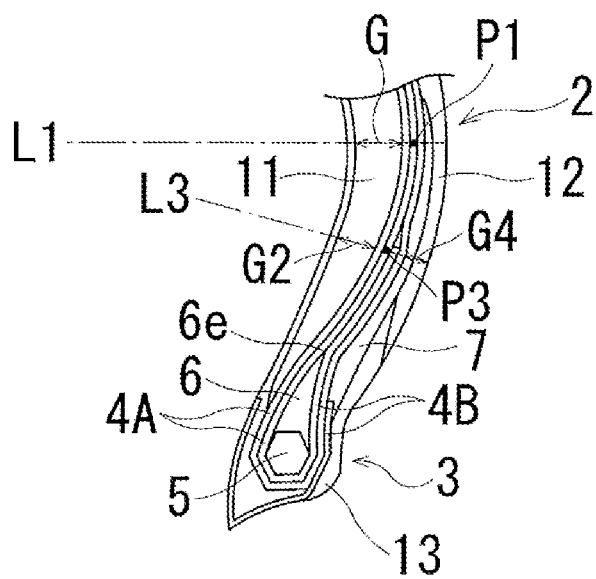

Additionally, in the run-flat tire described above, as illustrated in FIGS. 2A and 2B, a first reference line L1, a second reference line L2, and a third reference line L3 are hereby specified. The first reference line L1 is drawn from the tire maximum width position along the tire width direction. The second reference line L2 extends through a midpoint P2 of a length along the carcass layer 4 from an intersection point P1 between the first reference line L1 and the carcass layer 4 to an end 8e on an outer side in the tire width direction of the belt layer 8, and intersects the carcass layer 4 at right angles. The third reference line L3 extends through a midpoint P3 of a length along the carcass layer 4 from the intersection point P1 between the first reference line L1 and the carcass layer 4 to an end portion 6e on an outer side in the tire radial direction of the first bead filler 6, and intersects the carcass layer 4 at right angles. Then, in the side reinforcing layer 11, the thickness G on the first reference line L1, the thickness G1 on the second reference line L2, and the thickness G2 on the third reference line L3 satisfy the relationships of $0.8 \times G \leq G1 \leq 1.0 \times G$ and $0.5 \times G \leq G2 \leq 0.7 \times G$. The thickness G1 of the side reinforcing layer 11 is greater than the thickness G2 of the side reinforcing layer 11. The thickness G of the side reinforcing layer 11 is preferably in the range of from 10.0 mm to 11.0 mm. Note that in an embodiment of the present technology, when the embodiment includes a plurality of carcass layers 4, the length along the carcass layer 4 is a length measured within a predetermined range along the main body portion 4A of the carcass layer 4 located on an outermost side in the tire radial direction of the tread portion 1.

In the side reinforcing layer 11 of the run-flat tire described above, the thickness G on the first reference line L1, the thickness G1 on the second reference line L2, and the thickness G2 on the third reference line L3 are set to satisfy the relationships of $0.8 \times G \leq G1 \leq 1.0 \times G$ and $0.5 \times G \leq G2 \leq 0.7 \times G$. and thus a portion on the belt layer 8 side of the side reinforcing layer 11 is thicker than a portion on the bead portion 3 side and this contributes to suppressing deflection under run-flat travel conditions. Accordingly, run-flat durability can be effectively improved. Moreover, rolling resistance can be reduced and light weight can be achieved as well. Such reduction in rolling resistance and w eight contributes to reduction in carbon dioxide emissions and environmental protection.

Here, in the side reinforcing layer 11, when the thickness G on the first reference line L1 and the thickness G1 on the second reference line L2 satisfy the relationship of $G1 < 0.8 \times G$, run-flat durability tends to decline. In addition, in the side reinforcing layer 11, when the thickness G on the first reference line L1 and the thickness G2 on the third reference line L3 satisfy the relationship of $G2 < 0.5 \times G$, failure at an end portion of the first bead filler 6 may occur. On the other hand, when the same satisfy the relationship of $G2 > 0.7 \times G$, the weight of the tire increases, and vertical rigidity increases, and ride comfort and road noise are degraded.

In the run-flat tire described above, the thickness G3 (see FIG. 2A) on the second reference line L2 of the rubber layer located on the outer side in the tire width direction of the carcass layer 4 preferably satisfies the relationship of $0.2 \times G1 \leq G3 \leq 0.4 \times G1$ with respect to the thickness G1 on the second reference line L2 of the side reinforcing layer 11. Then, the rubber layer located on the outer side in the tire width direction of the carcass layer 4 may include a side rubber layer 12, and may also include a second bead filler 7. Specifically, the thickness G3 is preferably 2.5 mm or more. By thus setting the thickness G3 appropriately with respect to the thickness G1, the thickness of the buttress portion of the sidewall portion 2 can be reduced, and light weight can be achieved as well.

Additionally, the thickness G4 (see FIG. 2B) on the third reference line L3 of the rubber layer located on the outer side in the tire width direction of the carcass layer 4 preferably satisfies the relationship of $0.9 \times G2 \leq G4 \leq 1.1 \times G2$ with respect to the thickness G2 on the third reference line L3 of the side reinforcing layer 11. Then, the rubber layer located on the outer side in the tire width direction of the carcass layer 4 may include the second bead filler 7 and the side rubber layer 12, and may also include the rim cushion rubber layer 13. By thus setting the thickness G4 appropriately with respect to the thickness G2, the turned up portion 4B of the carcass layer 4 is disposed in the center in a thickness direction of the bead portion 3, and this can prevent force in a compression direction or a tensile direction from acting on the turned up portion 4B of the carcass layer 4, thus preventing damage to the carcass layer 4.

In the run-flat tire described above, a height h2 of the first bead filler 6 is preferably in the range of from 10% to 25% with respect to a tire cross-sectional height SH. For example, in a run-flat tire having a tire cross-sectional height SH of 140 mm, the height h2 of the first bead filler 6 is from 14 mm to 35 mm. By thus setting the height h2 of the first bead filler 6 appropriately with respect to the tire cross-sectional height SH, the first bead filler 6 can be prevented from interfering with a region where strain at or near the rim flange is prone to focus under run-flat travel conditions, and deformation of the first bead filler 6 can be effectively suppressed. Accordingly, run-flat durability can be improved and light weight can be achieved.

The first bead filler 6 and the second bead filler 7 overlap in the tire radial direction. A height h3 of an end portion (inner end) on the inner side in the tire radial direction of the second bead filler 7 is preferably in the range of from 50% to 75% with respect to the height h2 of the first bead filler 6. By thus setting the height h3 of the inner end of the second bead filler 7 appropriately with respect to the height h2 of the first bead filler 6, heat build-up between the contact surface with the rim and the carcass layer 4 can be suppressed, and rolling resistance can be reduced.

Additionally, an end portion (outer end) of the second bead filler 7 on an outer side in the tire radial direction is preferably further on an outer side in the tire radial direction than the tire maximum width position. In other words, a height h4 of the outer end of the second bead filler 7 is preferably greater than the height h1 of the tire maximum width position. By thus setting the position of the outer end of the second bead filler 7, the rigidity of the bead portion 3 can be increased, deformation of the bead portion 3 can be suppressed, and run-flat durability can be effectively improved.

Note that the tire cross-sectional height SH, the height h1 of the tire maximum width position, the height h2 of the first bead filler 6, the height h3 of the inner end of the second bead filler 7, and the height h4 of the outer end of the second bead filler 7 are heights measured with reference to the position in the tire radial direction of a bead base 3b of the bead portion 3.

Preferably, as the physical properties of each of the rubber constituting the first bead filler 6 and the rubber constituting the second bead filler 7, the modulus at 100% elongation (M100) is in the range of from 8.4 MPa to 10.2 MPa, the tan δ at 60° C. is in the range of from 0.04 to 0.08, and the JIS hardness at 20° C. is in the range of from 69 to 75. The physical properties of the rubber constituting the first bead filler 6 and of the rubber constituting the second bead filler 7 may be equivalent to each other, and may be different as long as the rubbers are in the ranges described above. By thus setting the physical properties of the rubber constituting the first bead filler 6 or the second bead filler 7, occurrence of separation of the carcass layer 4 located between the first bead filler 6 and the second bead filler 7 can be prevented, and run-flat durability can be improved. In addition, the rubbers are low heat build-up rubbers having the tan δ at 60° C. in the range of from 0.04 to 0.08, and thus heat build-up under run-flat travel conditions can be suppressed, and rolling resistance can be reduced. Furthermore, the JIS hardness at 20° C. is in the range of from 69 to 75, and run-flat durability and reduced rolling resistance can be provided in a compatible manner.

Compared to the physical properties of the rubber that constitutes the first bead filler 6 or the second bead filler 7 described above, the physical properties of the rubber constituting the side reinforcing layer 11 preferably include the modulus at 100% elongation in the range of from 8.4 MPa to 10.2 MPa, the tan δ at 60° C. in the range of from 0.04 to 0.08, and the JIS hardness at 20° C. in the range of from 69 to 75.

In embodiments of the present technology, the cord angle of the belt layers 8 with respect to the tire circumferential direction is in the range of from 25° to 35° as absolute values, and preferably at least one belt cover layer 9 covering the entire width of the belt layers 8 is disposed on an outer circumferential side of the belt layers 8. By thus appropriately setting the cord angle of the belt layers 8 and providing the belt cover layer 9 that constitutes a full cover, buckling of the tread portion 1 can be suppressed, and run-flat durability can be effectively improved. Here, when the cord angle is less than 25°, the component in the tire width direction of the cord is insufficient, and the buckling of the tread portion 1 cannot be sufficiently suppressed, and when the cord angle is greater than 35°, tire performance under normal travel conditions cannot be sufficiently obtained.

When the present technology is applied to a run-flat tire having a high tire cross-sectional height SH, the obtained effect is significant. In such a run-flat tire having a high tire cross-sectional height SH, the tire cross-sectional height SH is preferably in the range of 135 mm or more.

EXAMPLES

Tires of Conventional Example, Comparative Examples 1 and 2, and Examples 1 to 8 were manufactured. The tire cross-sectional height, the thicknesses of the portions of the side reinforcing layer, the thicknesses of the portions in the rubber layer on the outer side in the tire width direction of the carcass layer, the cord angle of the belt layers, the height and rubber physical properties of the first bead filler, and the height and rubber physical properties of the second bead filler were set as shown in Table 1. The tires have a tire size of 235/60RF18 and are each a run-flat tire including: a tread portion extending in a tire circumferential direction and having an annular shape; a pair of sidewall portions respectively disposed on both sides of the tread portion; a pair of bead portions each disposed on an inner side in the tire radial direction of the sidewall portions; a carcass layer mounted between the pair of bead portions; a plurality of belt layers disposed on an outer circumferential side of the carcass layer in the tread portion; and a side reinforcing layer disposed on an inner side in a tire width direction of the carcass layer in the sidewall portion, the side reinforcing layer having a crescent-shaped cross-section. The carcass layer is turned up around a bead core of each of the bead portions from a tire inner side to a tire outer side.

Note that in Table 1, a "low" height of an outer end of the second bead filler means that the outer end of the second bead filler is lower than the tire maximum width position, and a "high" height of the outer end of the second bead filler means that the outer end of the second bead filler is higher than the tire maximum width position.

Run-flat durability, rolling resistance, and tire weight were evaluated for these test tires according to the following evaluation methods, and the results thereof are shown in Table 1.

Run-Flat Durability:

Each of the test tires was mounted on a wheel having a rim size of 18×7.5 J, and a running test was performed by using a drum testing machine at an air pressure of 0 kPa and a load of 65% of the maximum load capacity defined by JATMA. More specifically, a running speed of 80 km/h was used, the tires were run until tire failure occurred, and running distances were measured. Evaluation results are expressed as index values with the value of Conventional Example being defined as 100. Larger index values indicate superior run-flat durability.

Rolling Resistance:

Each of the test tires was mounted on a wheel having a rim size of 18×7.5 J, and rolling resistance was measured by using a drum testing machine at an air pressure of 210 kPa, a load of 6.86 and a running speed of 80 km/h. Evaluation results are expressed as index values with the value of Conventional Example being defined as 100. Larger index values indicate smaller rolling resistance and hence superior results.

Tire Weight:

The weight of each test tire was measured. Evaluation results are expressed as index values, using the reciprocals of the measurement values, with the value of Conventional Example being defined as 100. Smaller index values indicate smaller tire weight and hence superior results.

TABLE 1

|  |  | Conventional Example | Comparative Example 1 | Comparative Example 2 |
|---|---|---|---|---|
| Tire cross-sectional height SH [mm] | | 140 | 140 | 140 |
| Side reinforcing layer | Thickness G [mm] | 10.0 | 10.0 | 10.0 |
| | Thickness G1 [mm] | 10.0 | 7.0 | 9.6 |
| | Thickness G2 [mm] | 10.0 | 6.0 | 4.6 |
| | G1/G | 1.0 | 6.7 | 0.9 |
| | G2/G | 1.0 | 0.6 | 0.4 |
| Rubber layer on outer side in tire width direction of carcass layer | Thickness G3 [mm] | 4.0 | 4.0 | 4.6 |
| | G3/G1 | 0.40 | 0.57 | 0.44 |
| | Thickness G4 [mm] | 4.0 | 4.0 | 4.0 |
| | G4/G2 | 0.40 | 0.67 | 1.00 |
| Cord angle of belt layer [deg] | | 24 | 24 | 24 |
| First bead filler | Height h2 [mm] | 45 | 45 | 45 |
| | Ratio of h2/SH [%] | 32 | 32 | 32 |
| | M100 [MPa] | 11 | 11 | 11 |
| | tan δ (60° C.) | 0.15 | 0.15 | 0.15 |
| | JIS hardness (20° C.) | 92 | 92 | 92 |

TABLE 1-continued

|  |  |  |  |  |
|---|---|---|---|---|
| Second bead filler | Height of outer end | — | Low | Low |
|  | Height h3 of inner end [mm] | — | 30 | 30 |
|  | Ratio of h3/h2 [%] | — | 67 | 67 |
|  | M100 [MPa] | — | 9.3 | 9.3 |
|  | tan δ (60° C.) | — | 0.05 | 0.05 |
|  | JIS hardness (20° C.) | — | 72 | 72 |
| Run-flat durability |  | 100 | 98 | 98 |
| Rolling resistance |  | 100 | 101 | 101 |
| Tire weight |  | 100 | 98 | 98 |

|  |  | Example 1 | Example 2 | Example 3 | Example 4 |
|---|---|---|---|---|---|
| Tire cross-sectional height SH [mm] |  | 140 | 140 | 140 | 140 |
| Side reinforcing layer | Thickness G [mm] | 10.0 | 10.0 | 10.0 | 10,0 |
|  | Thickness G1 [mm] | 9.0 | 9.0 | 9.0 | 9.0 |
|  | Thickness G2 [mm] | 6.0 | 6.0 | 6.0 | 6.0 |
|  | G1/G | 0.9 | 0.9 | 0.9 | 0.9 |
|  | G2/G | 0.6 | 0.6 | 0.6 | 0.6 |
| Rubber layer on outer side in tire width direction of carcass layer | Thickness G3 [mm] | 4.0 | 2.5 | 2.5 | 2.5 |
|  | G3/G1 | 0.44 | 0.28 | 0.28 | 0.28 |
|  | Thickness G4 [mm] | 4.0 | 4.0 | 6.0 | 6.0 |
|  | G4/G2 | 0.67 | 0.67 | 1.00 | 1.00 |
| Cord angle of belt layer [deg] |  | 24 | 24 | 24 | 24 |
| First bead filler | Height h2 [mm] | 45 | 45 | 45 | 45 |
|  | Ratio of h2/SH [%] | 32 | 32 | 32 | 32 |
|  | M100 [MPa] | 11 | 11 | 11 | 11 |
|  | tan δ (60° C.) | 0.15 | 0.15 | 0.15 | 0.15 |
|  | JIS hardness (20° C.) | 92 | 92 | 92 | 92 |
| Second bead filler | Height of outer end | Low | Low | Low | High |
|  | Height h3 of inner end [mm] | 30 | 3 0 | 30 | 30 |
|  | Ratio of h3/h2 [%] | 67 | 67 | 67 | 67 |
|  | M100 [MPa] | 9.3 | 9.3 | 9.3 | 9.3 |
|  | tan δ (60° C.) | 0.05 | 0.05 | 0.05 | 0,05 |
|  | JIS hardness (20° C.) | 72 | 72 | 72 | 72 |
| Run-flat durability |  | 102 | 102 | 103 | 104 |
| Rolling resistance |  | 101 | 103 | 102 | 102 |
| Tire weight |  | 99 | 97 | 98 | 98 |

|  |  | Example 5 | Example 6 | Example 7 | Example 8 |
|---|---|---|---|---|---|
| Tire cross-sectional height SH [mm] |  | 140 | 140 | 140 | 140 |
| Side reinforcing layer | Thickness G [mm] | 10.0 | 10.0 | 10.0 | 10.0 |
|  | Thickness G1 [mm] | 9.0 | 9.0 | 9.0 | 9.0 |
|  | Thickness G2 [mm] | 6.0 | 6.0 | 6.0 | 6.0 |
|  | G1/G | 0.9 | 0.9 | 0.9 | 0.9 |
|  | G2/G | 0.6 | 0.6 | 0.6 | 0.6 |
| Rubber layer on outer side in tire width direction of carcass layer | Thickness G3 [mm] | 2.5 | 2.5 | 2.5 | 2.5 |
|  | G3/G1 | 0.28 | 0.28 | 0.28 | 0.28 |
|  | Thickness G4 [mm] | 4.0 | 4.0 | 6.0 | 6.0 |
|  | G4/G2 | 0.67 | 0.67 | 1.00 | 1.00 |
| Cord angle of belt layer [deg] |  | 24 | 24 | 28 | 28 |
| First bead filler | Height h2 [mm] | 30 | 30 | 30 | 30 |
|  | Ratio of h2/SH [%] | 21 | 21 | 21 | 21 |
|  | M100 [MPa] | 11 | 11 | 11 | 9.3 |
|  | tan δ (60° C.) | 0.15 | 0.15 | 0.15 | 0.05 |
|  | JIS hardness (20° C.) | 92 | 92 | 92 | 72 |
| Second bead filler | Height of outer end | High | High | High | High |
|  | Height h3 of inner end [mm] | 30 | 20 | 20 | 20 |
|  | Ratio of h3/h2 [%] | 100 | 67 | 67 | 67 |
|  | M100 [MPa] | 9.3 | 9.3 | 9.3 | 9.3 |
|  | tan δ (60° C.) | 0.05 | 0.05 | 0.05 | 0.05 |
|  | JIS hardness (20° C.) | 72 | 72 | 72 | 72 |
| Run-flat durability |  | 105 | 105 | 106 | 107 |
| Rolling resistance |  | 103 | 104 | 104 | 105 |
| Tire weight |  | 97 | 97 | 97 | 197 |

As can be seen from Table 1, the run-flat tires according to Examples 1 to 8, as compared to that of Conventional Example, can reduce rolling resistance and weight while improving run-flat durability.

On the other hand, in Comparative Example 1 and Comparative Example 2, the ratios of the thicknesses of the portions in the side reinforcing layer are outside the ranges specified in the present technology, and thus run-flat durability is degraded, and the effect of reducing rolling resistance can not be sufficiently obtained.

The invention claimed is:

1. A run-flat tire, comprising:
 a tread portion extending in a tire circumferential direction and having an annular shape;

a pair of sidewall portions respectively disposed on both sides of the tread portion; and a pair of bead portions each disposed on an inner side in a tire radial direction of the sidewall portions;

a carcass layer being mounted between the pair of bead portions, a plurality of belt layers being disposed on an outer circumferential side of the carcass layer in the tread portion, a side reinforcing layer being disposed on an inner side in a tire width direction of the carcass layer in the sidewall portions, the side reinforcing layer having a crescent-shaped cross-section, the carcass layer being turned up around a bead core of each of the bead portions from a tire inner side to a tire outer side, a first bead filler being disposed on an outer circumferential side of the bead core, a second bead filler being disposed on an outer side in the tire width direction of a turned up portion of the carcass layer along the turned up portion of the carcass layer, a first reference line, a second reference line, and a third reference line being specified such that the first reference line is drawn from a tire maximum width position along the tire width direction, the second reference line extends through a midpoint of a length along the carcass layer from an intersection point between the first reference line and the carcass layer to an end on an outer side in the tire width direction of the belt layers and the second reference line intersects the carcass layer at right angles, and the third reference line extends through a midpoint of a length along the carcass layer from the intersection point between the first reference line and the carcass layer to an end portion on an outer side in the tire radial direction of the first bead filler and the third reference line intersects the carcass layer at right angles, and a thickness G on the first reference line of the side reinforcing layer, a thickness G1 on the second reference line of the side reinforcing layer, and a thickness G2 on the third reference line of the side reinforcing layer satisfying relationships of $0.8 \times G \leq G1 \leq 1.0 \times G$ and $0.5 \times G \leq G2 \leq 0.7 \times G$, and the side reinforcing layer being a uniform layer overlapping the first bead filler in the tire radial direction on a radially inner end of the side reinforcing layer and overlapping the belt layers in the tread portion in the tire width direction on a radially outer end of the side reinforcing layer.

2. The run-flat tire according to claim 1, wherein a thickness G3 on the second reference line of a rubber layer located on an outer side in the tire width direction of the carcass layer satisfies a relationship of $0.2 \times G1 \leq G3 \leq 0.4 \times G1$ with respect to the thickness G1 on the second reference line of the side reinforcing layer.

3. The run-flat tire according to claim 2, wherein a total rubber thickness G4 on the third reference line of rubber from the outer side in the tire width direction of the carcass layer to a fire outer surface satisfies a relationship of $0.9 \times G2 \leq G4 \leq 1.1 \times G2$ with respect to the thickness G2 on the third reference line of the side reinforcing layer.

4. The run-flat tire according to claim 3, wherein a height of the second bead filler is greater than that of the tire maximum width position.

5. The run-flat tire according to claim 4, wherein a height of the first bead filler is in a range of from 10% to 25% with respect to a tire cross-sectional height.

6. The run-flat tire according to claim 5, wherein a height of an end portion on an inner side in the tire radial direction of the second bead filler is in a range of from 50% to 75% with respect to the height of the first bead filler.

7. The run-flat tire according to claim 6, wherein a cord angle, as an absolute value, of the belt layer with respect to the tire circumferential direction is in a range of from 25° to 35°, and at least one belt cover layer covering an entire width of the belt layers is provided on an outer circumferential side of the belt layers.

8. The run-flat tire according to claim 7, wherein physical properties of each of rubber constituting the first bead filler and rubber constituting the second bead filler comprise a modulus at 100% elongation in a range of from 8.4 MPa to 10.2 MPa, a tan δ at 60° C. in a range of from 0.04 to 0.08, and a JIS hardness at 20° C. in a range of from 69 to 75.

9. A run-flat tire according to claim 8, wherein the tire cross-sectional height is 135 mm or more.

10. The run-flat tire according to claim 1, wherein a total rubber thickness G4 on the third reference line of rubber from the outer side in the tire width direction of the carcass layer to a tire outer surface satisfies a relationship of $0.9 \times G2 \leq G4 \leq 1.1 \times G2$ with respect to the thickness G2 on the third reference line of the side reinforcing layer.

11. The run-flat tire according to claim 1, wherein a height of the second bead filler is greater than that of the tire maximum width position.

12. The run-flat tire according to claim 1, wherein a height of the first bead filler is in a range of from 10% to 25% with respect to a tire cross-sectional height.

13. The run-flat tire according to claim 1, wherein a height of an end portion on an inner side in the tire radial direction of the second bead filler is in a range of from 50% to 75% with respect to the height of the first bead filler.

14. The run-flat tire according to claim 1, wherein a cord angle, as an absolute value, of the belt layer with respect to the tire circumferential direction is in a range of from 25° to 35°, and at least one belt cover layer covering an entire width of the belt layers is provided on an outer circumferential side of the belt layers.

15. The run-flat tire according to claim 1, wherein physical properties of each of rubber constituting the first bead filler and rubber constituting the second bead filler comprise a modulus at 100% elongation in a range of from 8.4 MPa to 10.2 MPa, a tan δ at 60° C. in a range of from 0.04 to 0.08, and a JIS hardness at 20° C. in a range of from 69 to 75.

16. A run-flat tire according to claim 1, wherein a tire cross-sectional height is 135 mm or more.

* * * * *